Sept. 25, 1962

H. GLAS 3,055,700

VEHICLE DOOR

Filed Jan. 28, 1960

Inventor:
Helmut Glas
by
Richards & Geier
ATTORNEYS

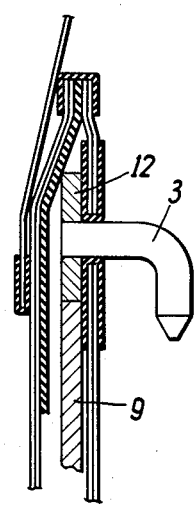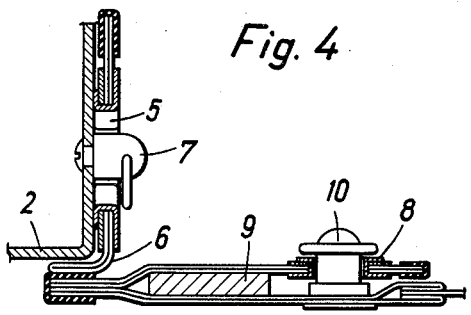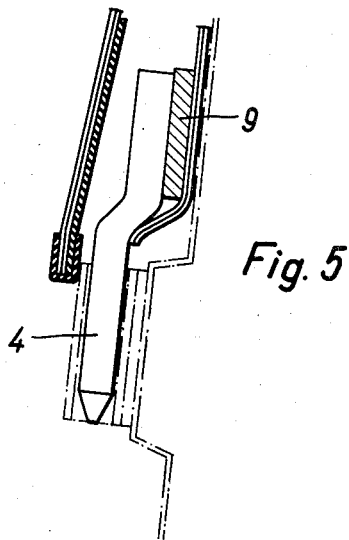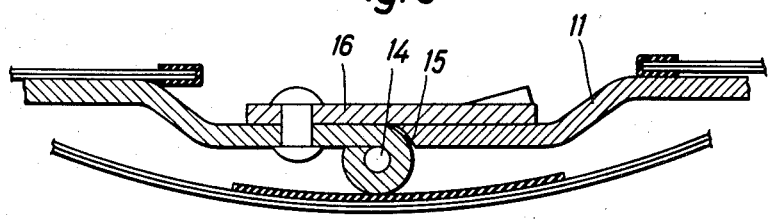

United States Patent Office 3,055,700
Patented Sept. 25, 1962

3,055,700
VEHICLE DOOR
Helmut Glas, Ingolstadt, Germany, assignor to Auto Union G.m.b.H., Ingolstadt, Germany
Filed Jan. 28, 1960, Ser. No. 5,256
Claims priority, application Germany Feb. 11, 1959
1 Claim. (Cl. 296—49)

The present invention relates to a vehicle door, particularly for motor vehicles, which comprises essentially a fabric-covered frame.

In motor vehicles suitable for cross-country operation it is known to fasten in the door opening, by means of buttons or other readily detachable means, a piece of fabric provided with windows. The frame which carries the fabric occupies only a part of the door opening, so that the only weather protection provided in the front portion of the door opening is a taut piece of fabric. When the front part of the fabric is fastened at many points to the vehicle body by means of eyelets and fasteners, removal of the vehicle door is rendered tedious, and when only a few fasteners and eyelets are used, sealing becomes difficult, so that sooner or later wind and rain will penetrate into the vehicle interior. When the fabric is removably attached to the window post and to the vehicle hood, and the lower side of the door is sealed by means of a strip which can be buttoned to the door frame from the inside, entering the vehicle becomes cumbersome and time-consuming. Furthermore, it is not easy to transport the door in the case of good weather in the vehicle, due to the fact that on account of its vertical stiffening bar the door is pliable in itself, but not foldable, and requires considerable space also in the removed or non-installed condition. This disadvantage can be avoided by using a motor vehicle door, the frame of which can be folded into a bundle of staves. However, the folding is a rather complex and time-consuming operation, because besides collapsing and folding up the frame, the fabric must also be unbuttoned from the frame. It is therefore an object of the present invention to provide a vehicle door which can be quickly installed and removed, which provides good sealing, and which is collapsible or foldable. Accordingly, the invention provides a door comprising a fabric-covered frame, particularly for cross-country vehicles, and the novelty resides in the fact that a non-pivotable section of the door is suspended in the door opening at the upper and lower front portion by means of pegs, and is sealingly secured in said door opening by means of eyelets and fasteners. The non-pivotable section remains fixed in the door opening while the passengers enter and leave the vehicle, whereas the pivotable sections make it easy to get into and out of the vehicle.

In order to permit the folding also of the pivotable section of the door, hinges with abutments are provided in the two horizontal members of the frame on the side facing the vehicle interior. These hinges can be locked in a simple manner by means of locking levers which are pivotably riveted to the frame. According to a further feature of the present invention, the movable section of the door is pivotable about hinges which are arranged adjacent the pegs on which the stationary door section is suspended. Thereby the door, in the installed condition, is rendered sufficiently rigid to provide good weather protection, and after its removal can be easily folded up in such a manner that it takes up little space and the elastic windows are relatively well protected. The folding of the door is further made possible by providing the fabric covering which lies closely against the front edges of the frame, on the inner side of the door adjacent the rear hinge with a cutout. In this manner, the rearmost door section can be folded outwardly without encountering resistance which might otherwise be produced by the stretching of the fabric covering. By providing the cutout on the inner side of the door and in such a manner that it ends at the frame of the door opening, the ingress of draught, rain, etc. is prevented.

The invention will now be described in more detail in the following description of an embodiment which is given by way of example only, and with reference to the accompanying drawings. In the drawings:

FIG. 3 is a part-sectional view of the door taken in the vicinity of the upper door hinge along line III—III of FIG. 2;

FIG. 4 is a part-sectional view of the door with the windshield frame, taken along line IV—IV of FIG. 2;

FIG. 5 is a section through the door in the vicinity of the lower door hinge, taken along line V—V of FIG. 2; and FIG. 6 is a section on line VI—VI of FIG. 2, through the lower middle hinge for folding the door.

Figure 1:
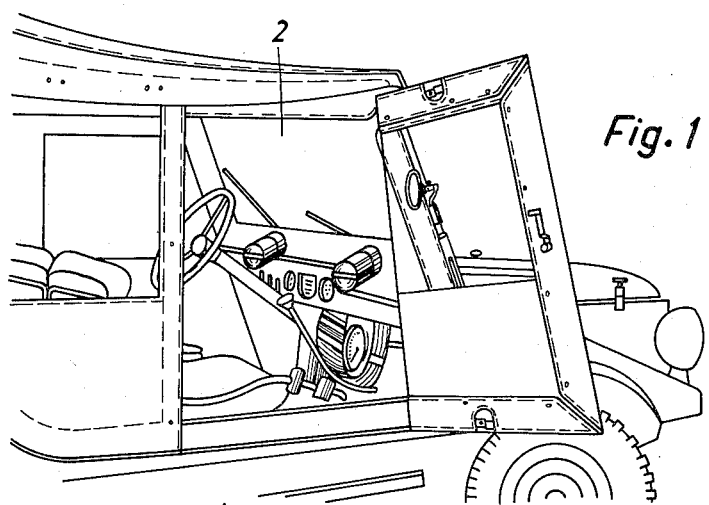
FIG. 1 is a perspective view of a cross-country motor vehicle with open door.
Figure 2:
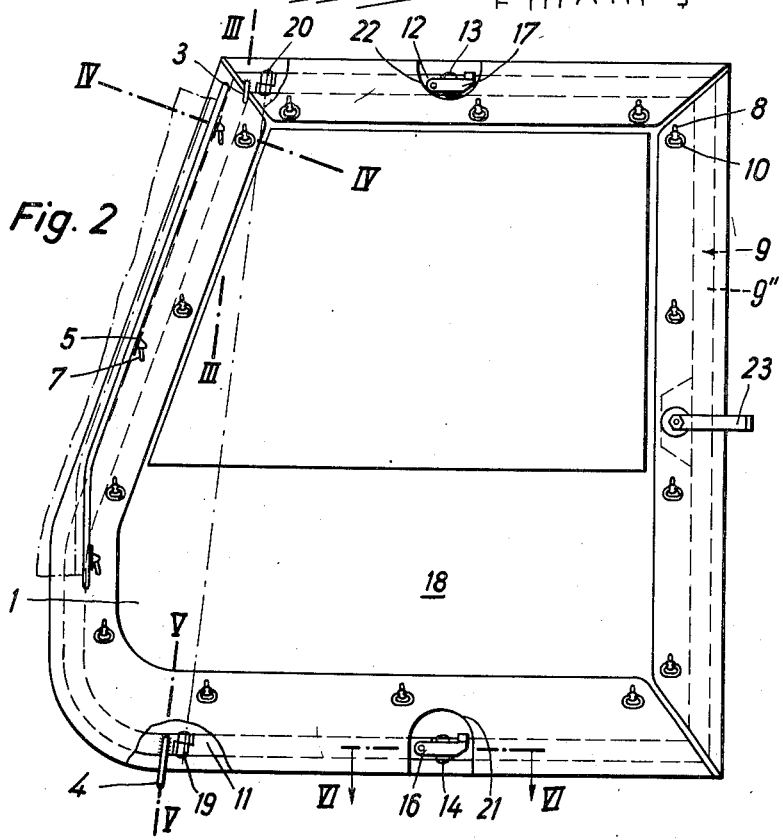
FIG. 2 is an elevation of the door seen from the inside.

As shown in the drawing, the door has a front non-pivotable section 1 and a rear swingable section 18; the non-pivotable section 1 of the door is suspended in the door opening 2 by means of pegs 3, 4 provided on the upper, respectively lower front portion of the door section. FIG. 2 shows by broken lines the division between the non-pivotable section 1 and the swingable section 18. The fabric covering 6 enclosing the frame 9 has a perpendicularly extending portion 6′ which is sealingly attached to the part of the vehicle body defining the front edge of the door opening, by means of eyelets 5 and fasteners 7. The frame 9 has a non-pivotable section 9′ which carries the pegs 3 and 4, and which constitutes a part of the non-pivotable section 1 of the door. Since the pegs 3, 4 can be introduced into their corresponding eyes only from above, the eyelets 5 and fasteners 7 also serve to secure the non-pivotable door section 1 against inadvertently being disengaged or shaken out of its muntings during operation of the vehicle. The fabric covering 6 is likewise secured by means of eyelets 8 and fasteners 10 to the frame 9 which preferably consists of flat bar stock. In its horizontally extending members 11, 12 the frame 9 is provided with hinges 13, 14. In order to assure that these hinges 13, 14 permit a swinging of the rear door section extending between these hinges and the locking levers 23 (FIG. 2) only in the outward direction, they are provided with abutments 15 on the side facing the vehicle interior. During operation of the vehicle, the hinges 13, 14 are locked by means of pivotable locking levers 16, 17 which are riveted to the door frame and engage the horizontal frame members in the locked position. The rear section 18 of the door is pivotable about hinges 19, 20 which are situated adjacent the pegs 3, 4. In order to permit folding of the door without any distortion, the fabric covering 6 on the inside of the door is provided with cutouts 21, 22 which leave the hinges 13, 14 free. The two pivotable sections of the door can be locked by means of locking levers 23 which can be actuated from the inside as well as from the outside of the vehicle.

It is thus apparent from the above description and drawings that the metallic frame 9 of the door consists of a rear vertical portion 9″, horizontal portions 11 and 12 and a front portion 9′ which has a lower vertical part and a somewhat obliquely upwardly extending upper part, as best shown in FIG. 2 wherein the width of the frame portions is indicated by broken lines. The upper end of the frame portion 9′ is connected with the horizontal frame portion 12 by the hinge 20. The lower end of the frame portion 9' is connected with the horizontal frame portion 11 by the hinge 19. The horizontal frame portions 11 and 12 are integral with the vertical portion 9''. The frame portion 9' carries pegs 3 and 4 by means of which it is fixed upon the frame 2 (FIG. 4) constituting a fixed part of the automobile body. Thus the frame portions 11, 12 and 9'' can swing about the hinges 19 and 20 relatively to the frame portion 9'. The broken line extending between the hinges 19 and 20 and shown in FIGURE 2 denotes the axis about which the swingable portion 18 of the door (consisting of the frame portions 11, 12 and 9'' and the fabric covering which encloses them) is swung relatively to the immovable portion 1 of the door (consisting of the frame portion 9' and the adjacent fabric covering). It should be noted, however, that there is a hinge 13 located substantially in the middle of the horizontal frame portion 12, while a similar hinge 14 is located substantially in the middle of the horizontal frame portion 11. Thus the portion 18 of the door in addition to being able to swing as a unit, can be also folded upon itself along an axis joining the hinges 13 and 14. The levers 16 and 17 (FIGS. 2 and 6) provide that the door portion 18 can be folded only in the outward direction.

FIGURE 2 indicates that the fabric coverings enclosing the frame portions are considerably wider than the frame. However, they will not interfere with the swinging or folding of the frame.

I claim:

In combination with a vehicle body having a door opening with a front edge, a removable and foldable door comprising a frame having a substantially vertical front portion, a rear vertical portion, and two horizontal portions integral with said rear vertical portion, hinges connecting said front portion with said horizontal portions, whereby said rear vertical portion and said horizontal portions are swingable upon said hinges relatively to said front portion, pegs carried by said front portion for attaching said front portion to said front edge of the vehicle body, other vertically alined hinges carred by said horizontal portions intermediate the ends thereof, and locking levers pivoted to said horizontal portions adjacent the last-mentioned hinges for locking the last-mentioned hinges in the horizontal position of said locking levers; a fabric covering enclosing said portions of the frame, interengaging eyelets and fasteners carried by said covering for holding said covering upon said frame, said covering having a portion extending over a portion of said front edge of the vehicle body, and other eyelets and fasteners firmly connecting said portion of the covering to said portion of the front edge of the vehicle body.

References Cited in the file of this patent

UNITED STATES PATENTS

| | | |
|---|---|---|
| 582,450 | Brandenburg | May 11, 1897 |
| 1,455,991 | Childs | May 22, 1923 |
| 1,593,860 | Abraham | July 27, 1926 |
| 1,825,538 | Pace | Sept. 29, 1931 |
| 2,186,510 | Walter et al. | Jan. 9, 1940 |
| 2,321,216 | Lisko | June 8, 1943 |
| 2,423,748 | Achesen | July 8, 1947 |
| 2,670,932 | Westerfor | Mar. 2, 1954 |
| 2,682,427 | Bright | June 29, 1954 |